US010257390B2

(12) United States Patent
Terao

(10) Patent No.: US 10,257,390 B2
(45) Date of Patent: Apr. 9, 2019

(54) IMAGE PROCESSING APPARATUS THAT TRANSFERS TO A SET TRANSMITTING DESTINATION WHEN A SET CONDITION IS SATISFIED, METHOD OF CONTROLLING THE SAME AND STORAGE MEDIUM

(71) Applicant: CANON KABUSHIKI KAISHA, Tokyo (JP)

(72) Inventor: Yoshihide Terao, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/852,234

(22) Filed: Dec. 22, 2017

(65) Prior Publication Data

US 2018/0124281 A1 May 3, 2018

Related U.S. Application Data

(63) Continuation of application No. 15/188,035, filed on Jun. 21, 2016, now Pat. No. 9,888,151.

(30) Foreign Application Priority Data

Jul. 7, 2015 (JP) .................................. 2015-136369

(51) Int. Cl.
*H04N 1/44* (2006.01)

(52) U.S. Cl.
CPC ......... *H04N 1/4433* (2013.01); *H04N 1/4413* (2013.01)

(58) Field of Classification Search
None
See application file for complete search history.

(56) References Cited

U.S. PATENT DOCUMENTS

| 8,045,196 B2 | 10/2011 | Fukui et al. |
| 9,230,073 B2 | 1/2016 | Yamada |
| 2004/0125414 A1 | 7/2004 | Ohishi et al. |
| 2008/0047020 A1 | 2/2008 | Masui |
| 2011/0026075 A1 | 2/2011 | Maruyama et al. |
| 2011/0099185 A1 | 4/2011 | Trevor et al. |
| 2011/0265144 A1 | 10/2011 | Ikeda et al. |
| 2012/0327465 A1 | 12/2012 | Yamada |
| 2013/0308158 A1 | 11/2013 | Morita |
| 2016/0012139 A1 | 1/2016 | Terao |

*Primary Examiner* — Thomas D Lee
(74) *Attorney, Agent, or Firm* — Venable LLP

(57) ABSTRACT

An image processing apparatus that transmits image data via a network, and a method of controlling the same, store a common destination table that users can reference commonly, and a personal destination table that a specific user can reference, and control so that when a transfer destination of image data in accordance with an operation of a user is set, the user can set the transfer destination by referencing the common destination table excluding the stored personal destination table.

10 Claims, 8 Drawing Sheets

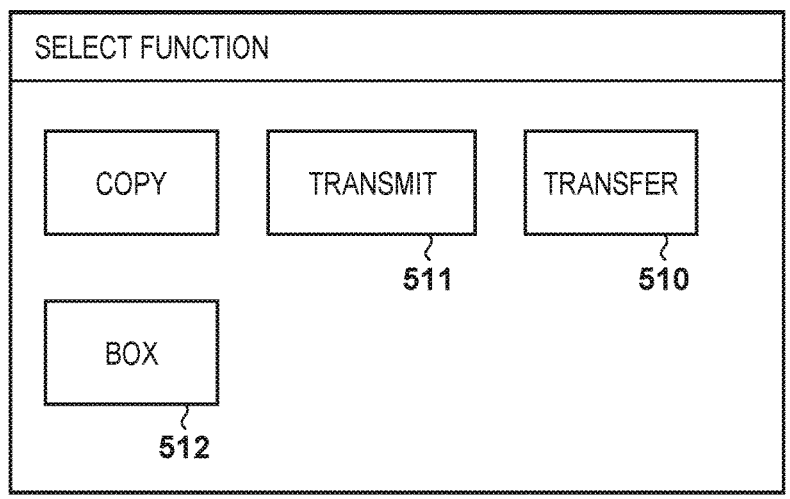
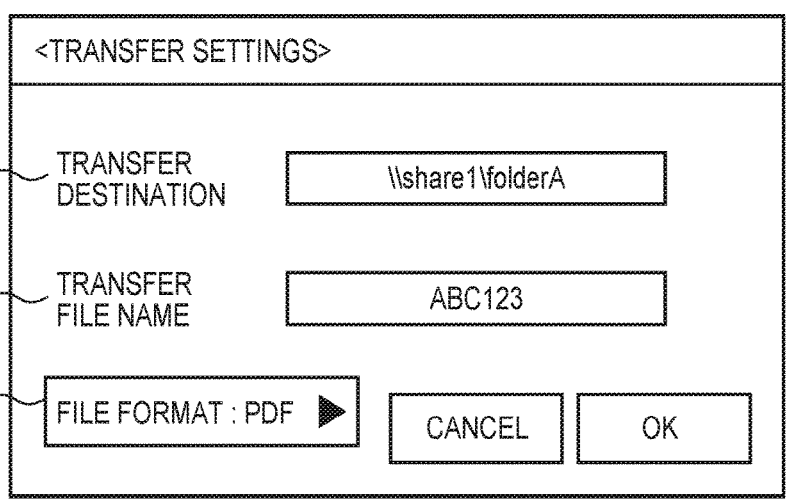
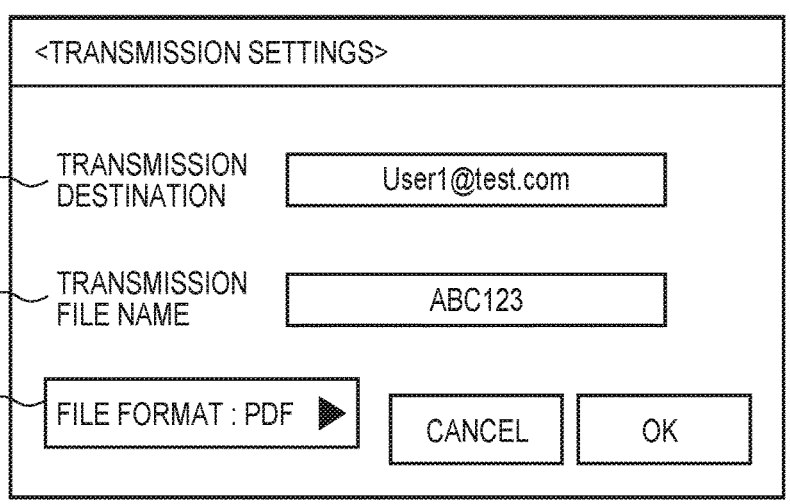

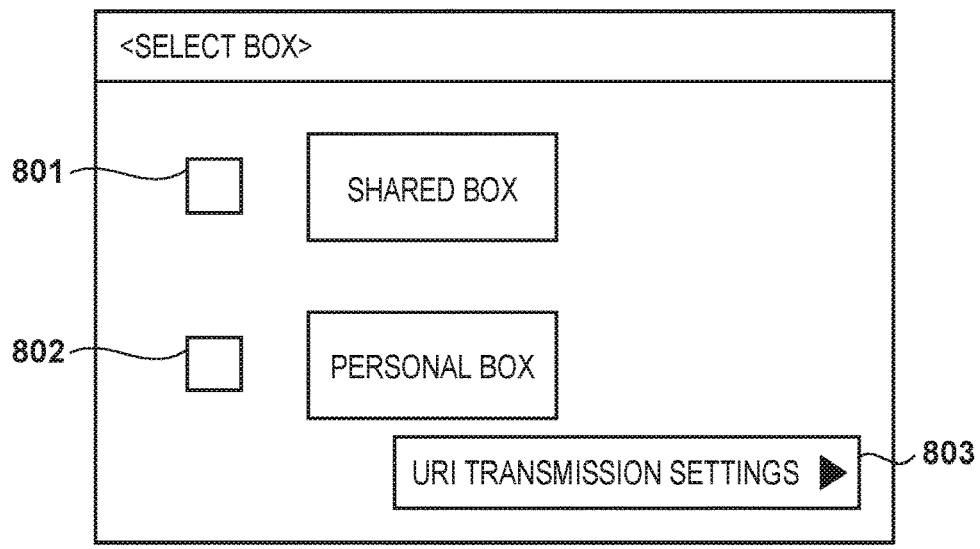

IMAGE PROCESSING APPARATUS THAT TRANSFERS TO A SET TRANSMITTING DESTINATION WHEN A SET CONDITION IS SATISFIED, METHOD OF CONTROLLING THE SAME AND STORAGE MEDIUM

BACKGROUND OF THE INVENTION

Field of the Invention

The present invention relates to an image processing apparatus, a method of controlling the same, and a storage medium.

Description of the Related Art

Conventionally, in an image processing apparatus of a digital multi-function peripheral or the like, document data that is acquired by scanning a document is digitized, and transmitted to an external server. Also, there have been image processing apparatuses that have a destination table for eliminating the effort of inputting destinations every time upon transmission, and by making it possible to select a desired destination from the destination table, the burden of destination input on a user is reduced.

Additionally, further improvement in operability is devised by managing destinations which can be shared only within groups linked to an authenticated user because an image processing apparatus of a digital multi-function peripheral or the like is used commonly by a plurality of users. (refer to Japanese Patent Laid-Open No. 2013-008108).

However, in the technique recited in Japanese Patent Laid-Open No. 2013-008108, user authentication is required upon usage. However, in a case where received document data is transferred, there is no guarantee that a user is logged in to the apparatus at the time of the transfer. For this reason, at a time when a user is not authenticated when a destination of a destination table linked to user authentication is set to the destination when transferring, the destination to be the transfer destination cannot be obtained, resulting in a transfer error.

To prevent an occurrence of these kinds of situations, temporarily saving to a built-in memory a destination table linked to user authentication, for example, and referencing the saved destination table to perform the transfer at the time of transfer can be considered. However, when a destination table is held in a built-in memory in this way, it is necessary to also update the destination table that is held in the built-in memory simultaneously when the original destination table is changed. However, when that operation is forgotten, the transfer destination remains as the destination prior to the update, leading to a mistaken destination being transferred to.

An object of the present invention is to solve the above-described problems of the conventional techniques.

SUMMARY OF THE INVENTION

The present invention enables realization of a mechanism that is configured such that a destination of a destination table that is linked to user authentication and that only a specific user can reference cannot be set to a transfer destination for a time of reception/transfer.

One aspect of the present invention provides an image processing apparatus for transmitting image data via a network, comprising: a storage unit configured to store a common destination table that users can reference commonly, and a personal destination table that a specific user can reference; a setting unit configured to set a transfer destination of image data in accordance with an operation of a user; and a control unit configured to control such that, when the setting unit sets the transfer destination, the user can set the transfer destination by referencing the common destination table excluding the personal destination table stored in the storage unit.

Another aspect of the present invention provides an image processing apparatus having a function configured to store image data, comprising: a storage unit configured to store a common destination table that users can reference commonly, and a personal destination table that a specific user can reference; an image data storage unit configured to have a shared box which users can share and a personal box for a specific user as a storage location for image data; a setting unit configured to set a URI of an image data storage location in accordance with an operation of a user; and a control unit configured to control such that if the image data storage location is the shared box when the setting unit sets the URI, the URI can be set by referencing the common destination table excluding the personal destination table stored in the storage unit.

Still another aspect of the present invention provides a method of controlling an image processing apparatus that has a storage unit configured to store a common destination table that users can reference commonly, and a personal destination table that a specific user can reference, and that transmits image data via a network, the method comprising: setting an image data transfer destination in accordance with an operation of a user; and controlling such that, when the transfer destination is set, the user can set the transfer destination by referencing the common destination table excluding the personal destination table stored in the storage unit.

Yet still another aspect of the present invention provides a method of controlling an image processing apparatus having a storage unit configured to store a common destination table that users can reference commonly, and a personal destination table that a specific user can reference, and having a function for storing image data, there being a shared box which users can share and a personal box for a specific user as a storage location for image data, the method comprising: setting a URI of an image data storage location in accordance with an operation of a user; and controlling such that, if the image data storage location is the shared box when the URI is set, the URI can be set by referencing the common destination table excluding the personal destination table stored in the storage unit.

Still yet another aspect of the present invention provides a non-transitory computer-readable storage medium storing a computer program for causing a computer to execute a method of controlling an image processing apparatus having a storage unit configured to store a common destination table that users can reference commonly, and a personal destination table that a specific user can reference, and having a function for storing image data, there being a shared box which users can share and a personal box for a specific user as a storage location for image data, the method comprising: setting a URI of an image data storage location in accordance with an operation of a user; and controlling such that, if the image data storage location is the shared box when the URI is set, the URI can be set by referencing the common destination table excluding the personal destination table stored in the storage unit.

Further features of the present invention will be apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to describe the principles of the invention.

FIGS. 5A-5C depict a view for showing an example of a screen displayed on a display unit of an operation unit of the image processing apparatus according to a first embodiment.

FIGS. 8A-8C depict a view for showing an example of a screen which is displayed when the box function is selected in the image processing apparatus according to a second embodiment.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Figure 1:
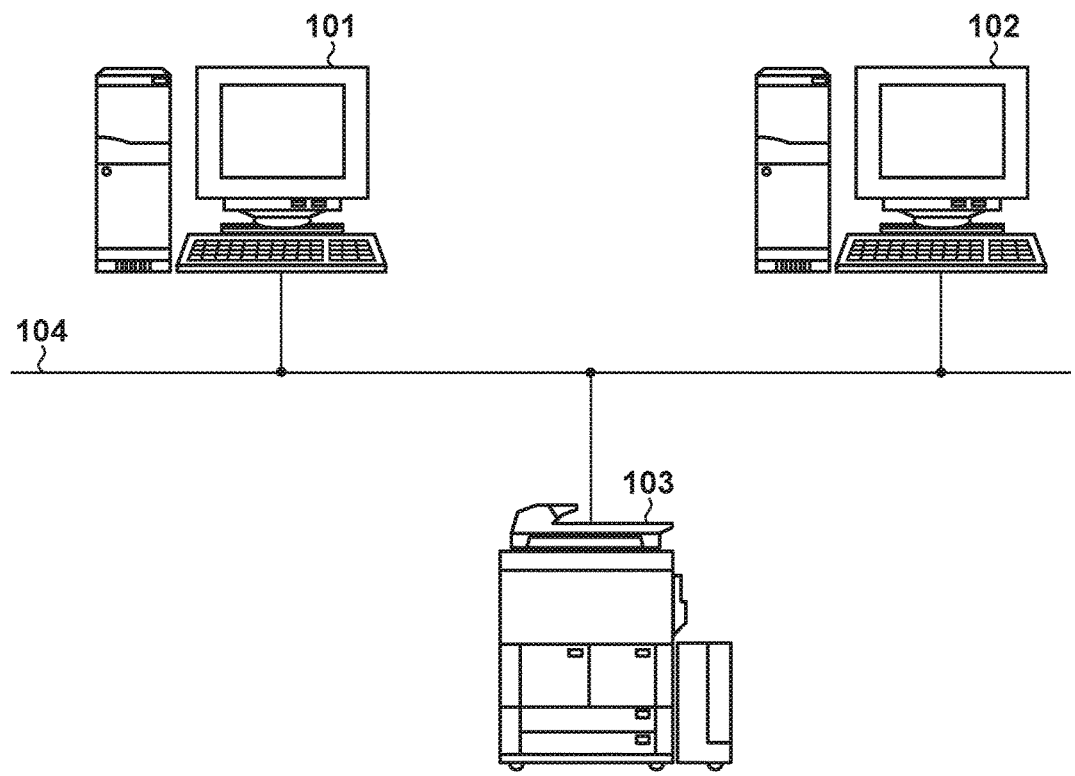
FIG. 1 depicts a view illustrating an example configuration of a system according to a first embodiment of the present invention.

FIG. 1 depicts a view illustrating an example configuration of a system according to a first embodiment of the present invention.

An image processing apparatus 103 is an apparatus which has a scan function, a print function, a facsimile sending/receiving function, a box function or the like such as a multi-function peripheral (MFP) for example. The image processing apparatus 103 can digitize data acquired by scanning an original document, and transmit the data to a mail server 102 or a file sharing server (such as an SMB/FTP/WebDAV server) of a computer (PC) 101 via a network 104. Also, the image processing apparatus 103 has a user authentication function, and an administrator of the image processing apparatus 103 can set whether user authentication is required when a user operates the image processing apparatus 103.

Figure 2:
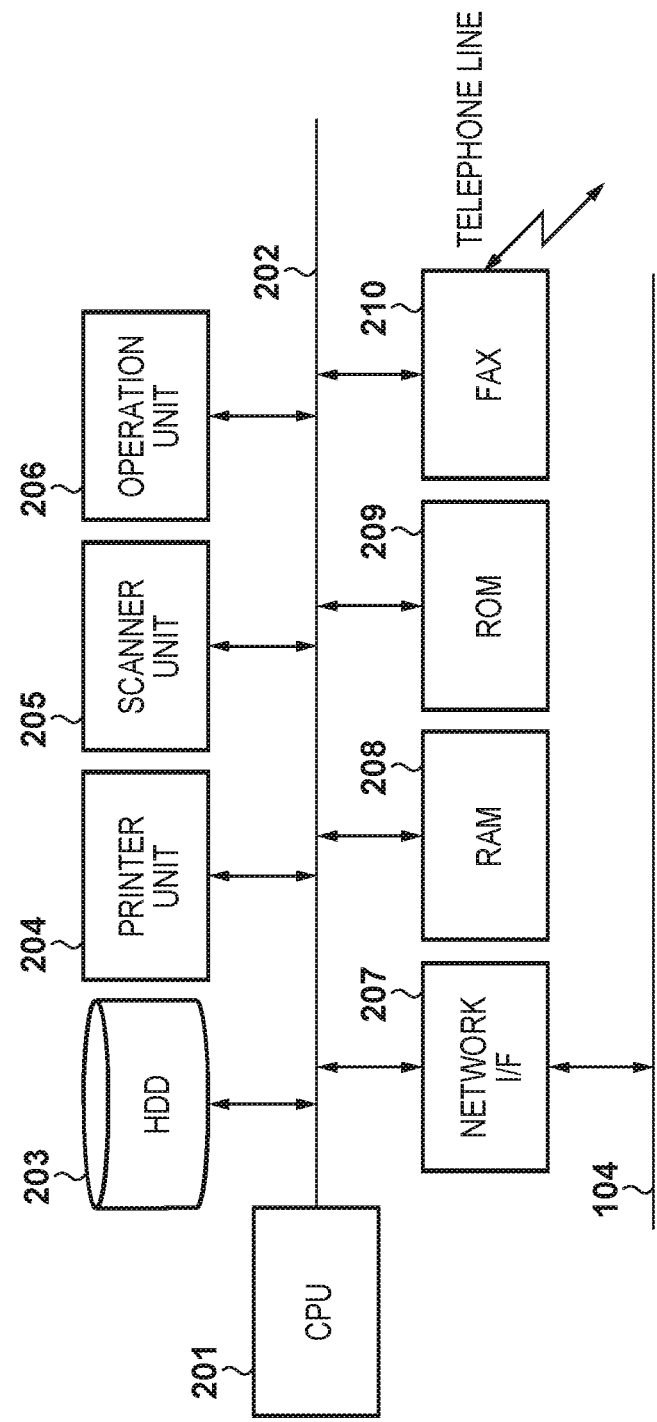
FIG. 2 depicts a block diagram describing a hardware configuration of an image processing apparatus according to a first embodiment.

FIG. 2 depicts a block diagram describing a hardware configuration of the image processing apparatus 103 according to a first embodiment.

A CPU 201 executes a boot program stored in a ROM 209 and loads an OS or a program stored in an HDD 203 to a RAM 208, and controls operation of the image processing apparatus 103 by execution thereof. Also, the CPU 201 controls each unit connected to a bus 202 via the bus 202. A printer unit 204 prints an image based on inputted image data onto a print paper (sheet). A scanner unit 205 reads the image of the original document set by the user on a platen, thereby outputting the acquired image data to the bus 202. Also, the scanner unit 205 includes a document feeder, and can sequentially feed a plurality of sheets of original documents set in the document feeder to the platen to read them. The CPU 201 stores the image data thus output to the bus 202 from the scanner unit 205 in the HDD 203 by DMA for example. The HDD 203 is a hard disk drive which includes a hard disk, and stores each kind of user data (such as a destination table (an address book)) and image data input by the scanner unit 205. An operation unit 206 includes a plurality of keys for a user to perform instructions, and a display unit which displays various information to be notified to the user. Note, the display unit may also have a touch panel function. A network I/F 207 connects the image processing apparatus 103 to the network 104, and transfers image data acquired by the scanner unit 205 to the computer 101 via the network 104. A FAX 210 performs transmission and reception of facsimile data via a telephone line. Received data is digitized under the control of the CPU 201 and is stored in the HDD 203, or printed by the printer unit 204.

Figure 3:
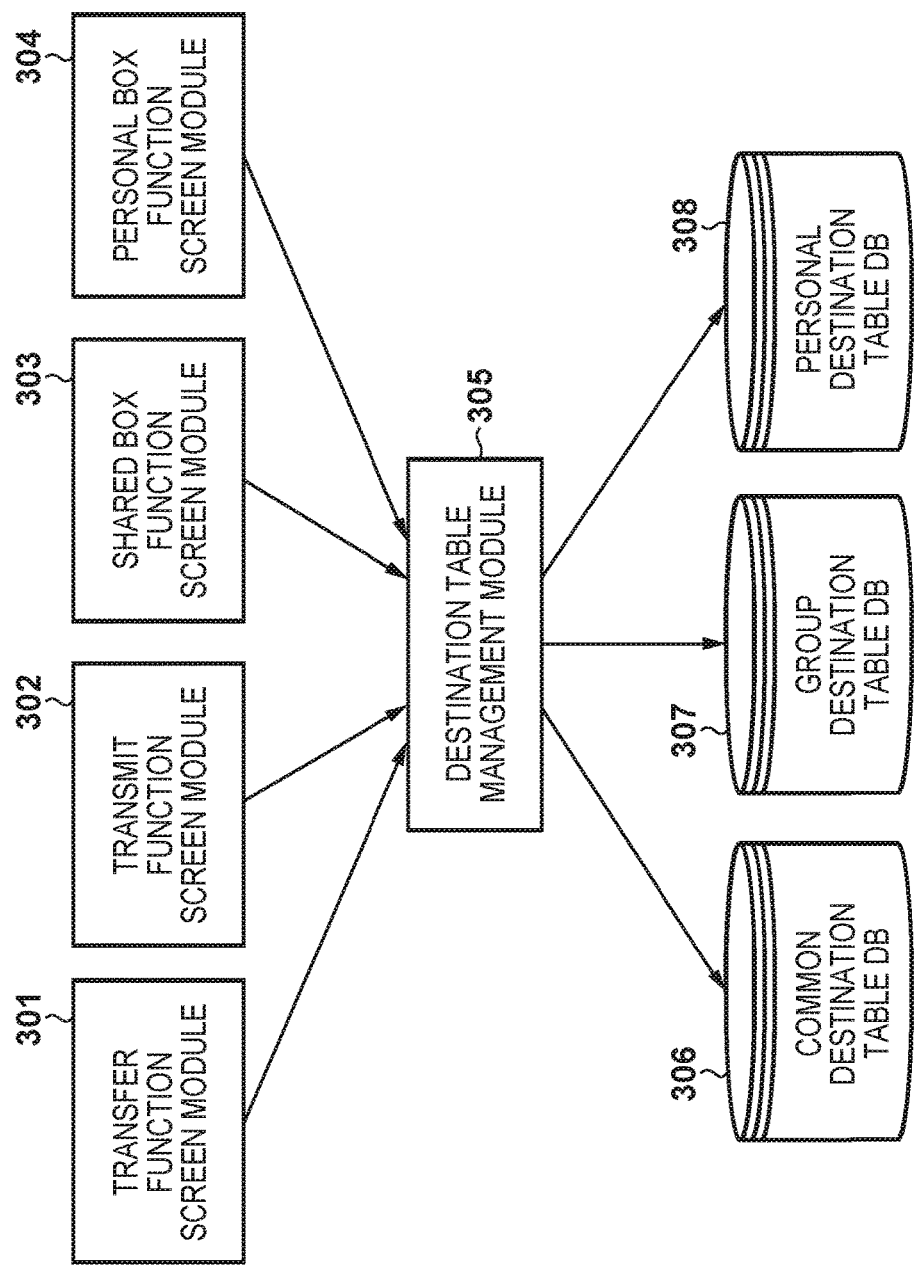
FIG. 3 depicts a configuration diagram of a program which manages a destination table in an image processing apparatus according to a first embodiment.

FIG. 3 depicts a configuration diagram of a program which manages destination tables in the image processing apparatus 103 according to a first embodiment.

When a destination table management module 305 receives a request to display destination tables from function screen modules 301-304, it obtains destination tables that all users can reference from a common destination table DB 306 stored in the HDD 203. Here, the obtained destination table is returned to the call source function screen modules 301-304. The destination table management module 305 also receives requests to display destination tables to which user information of the user who logged in is attached from the function screen modules 301-304. At this time, the destination table management module 305 obtains destination tables linked to this user information from the common destination table DB 306, a group destination table DB 307, and a personal destination DB 308. In this way, when the destination table management module 305 obtains destination tables, it returns the obtained destination tables to the respective request source function screen modules 301-304. Note, a transfer function screen module 301, when a transfer button 510 of FIG. 5A is pressed, displays a screen for transfer settings illustrated in FIG. 5B. Also, the transmission function screen module 302, when a transmit button 511 is pressed, displays a screen for transmission settings illustrated in FIG. 5C. Also, a shared box function screen module 303 and a personal box function module 304 display a setting screen corresponding to a box button 512 of FIG. 5A. Description will be given in the second embodiment regarding the box function.

Below, a method of displaying destination tables according to a first embodiment is described with reference to the flowchart of FIG. 4.

Figure 4:
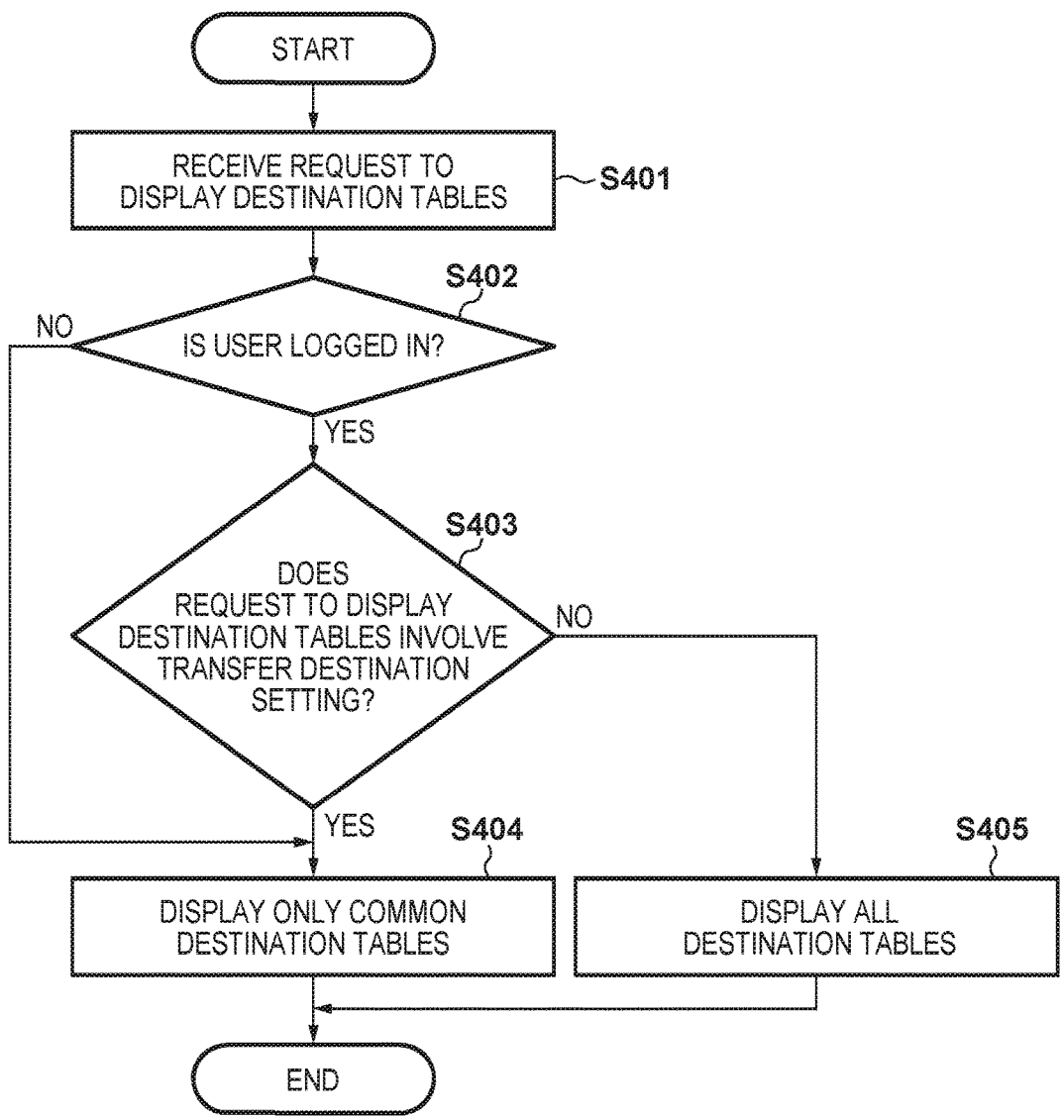
FIG. 4 depicts a flowchart for describing processing for displaying destination tables in an image processing apparatus according to a first embodiment.

FIG. 4 is a flowchart for describing processing for displaying destination tables in the image processing apparatus 103 according to a first embodiment. Note, the processing illustrated by the flowchart is realized by the CPU 201 loading a program to the RAM 208 from the HDD 203, and executing the program.

Before describing this processing, a screen that is displayed on the display unit of the operation unit 206 of the image processing apparatus 103 according to a first embodiment is described with reference to FIGS. 5A-5C.

FIGS. 5A-5C depict a view for showing an example of screens displayed on a display unit of the operation unit 206 of the image processing apparatus 103 according to a first embodiment.

FIG. 5A illustrates a menu screen for selecting each function, and by a user pressing the transfer button 510 which instructs the transfer function on the screen, a display control is performed to transition to the transfer setting screen illustrated in FIG. 5B.

The user via the transfer setting screen of FIG. 5B can set data or the like received by the FAX 210 to transfer to a destination set in a transfer destination 501 item. The transfer destination set in the transfer destination 501 can be set by referring to a destination table, and selecting a destination included in the destination table. Here, "\\share1\folderA" is set as the transfer destination. A transfer file name 502 sets a file name assigned to the data to be transferred. Here, "ABC123" is set as the file name. A file format 503 sets the file format of the data to be transferred. Here, "PDF" is set as the file format. Also, a setting of a transfer condition (not shown) is included in the transfer settings. The transfer condition can be defined as a condition that a destination of data received by the FAX 210 is a particular destination, or a condition that a transmission source of data received by the FAX 210 a particular transmission source. The CPU 201, in a case where data is received by the FAX 210, determines whether or not the transfer condition is satisfied, and if determines that the transfer condition is satisfied, transfers the received data. In contrast, if it is determined that the transfer condition is not satisfied, the CPU 201 causes the printer unit 204 to execute printing based on the received data. Here, when an OK button is pressed, the transfer settings input on the screen are finalized, and by pressing a cancel button, the transfer settings input on this screen are discarded and the screen of FIG. 5A is returned to. The finalized transfer condition is stored in the HDD 203 such that the CPU 201 can reference the transfer condition when data is received.

Also, on the screen of FIG. 5A, when a user presses a transmit button 511 which instructs the transmission function, a transmission setting screen illustrated in FIG. 5C is transitioned to.

The user via the transmission setting screen of FIG. 5C transmits image data scanned and acquired by the scanner unit 205 to a destination set in a transmission destination 504. The transmission destination 504 sets the destination to which to transmit the scanned and acquired image data. The transmission destination set in the transmission destination 504 can be set by referring to a destination table, and selecting a destination included in the destination table. Here, "User1@test.com" is set as the transmission destination. A transmission file name 505 sets the file name for when the image data is transmitted. Here, "ABC123" is set as the file name. A file format 506 sets the file format of the data to be transmitted. Here, "PDF" is set as the file format. Here, when an OK button is pressed, the transmission settings input on this screen are finalized, and by pressing a cancel button, the transmission settings input on this screen are discarded and the screen of FIG. 5A is returned to. The finalized transmission settings are stored in the HDD 203 such that the CPU 201 can reference these transmission settings when data is received. After this, if a transmission instruction is accepted via the operation unit 206, the CPU 201 reads an original document by the scanner unit 205. Then, the CPU 201 converts the image data of the read original document to a file, and the file is transmitted to the destination set in the transmission destination 504. The file name set in the transmission file name 505 is assigned by the CPU 201 for the file.

Next, the flowchart of FIG. 4 will be described.

First, the CPU 201 in step S401 receives a request to display destination tables. By the user pressing the transfer button 510 or the transmit button 511 on the screen of FIG. 5A, the request to display destination tables is determined to be input. Next, the processing proceeds to step S402, the CPU 201 determines whether or not the user is logged in to the image processing apparatus 103. Here, if it is determined that the user is not logged in the processing proceeds to step S404, and the CPU 201 obtains destination tables only from the common destination table DB 306, the obtained destination tables are displayed on the display unit of the operation unit 206, and the processing is terminated.

Figure 6A:
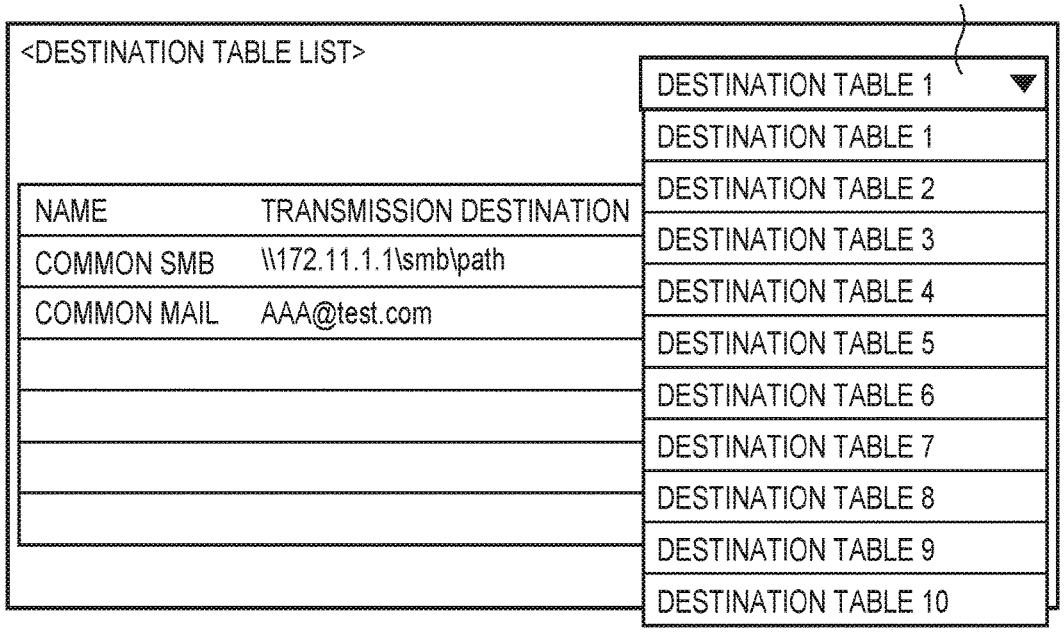
FIGS. 6A and 6B depicts a view illustrating an example of a destination table display screen which is displayed by the image processing apparatus according to a first embodiment.

An example of a screen for displaying destination tables displayed in step S404 is illustrated in FIG. 6A.

In FIG. 6A, in a destination table list 601, destination tables saved in the common destination table DB 306 are displayed as destination tables 1-10. Here, actual destination data is classified and saved in the destination tables 1-10.

In contrast, if the CPU 201 in step S402 determines that a user is logged in the processing proceeds to step S403, and the CPU 201 determines whether the request to display destination tables received in step S401 is something for which the transfer button 510 was pressed, in other words, whether or not the request to display destination tables involves a transfer destination setting. If it is something for which the transfer button 510 was pressed, the processing proceeds to step S404, and the CPU 201 obtains destination tables from only the common destination table DB 306, displays the obtained destination tables on the display unit of the operation unit 206, and terminates the processing. Specifically, in step S404, destination tables which only the logged in user can reference are caused to not be displayed, so that destinations of destination tables which only the logged in user can reference cannot be set as the destination of the transfer destination. After the destination tables are displayed on the operation unit 206, the user, from among at least one destinations included in the displayed destination tables, designates the destination desired to be set as the transfer destination, and causes the designated destination to be finalized. The finalized destination is stored in the HDD 203 such that it can be referenced by the CPU 201.

On the other hand, when the CPU 201 in step S403 determines that the request to display destination tables received in step S401 is not due to the pressing of the transfer button 510—for example it is due to the pressing of the transmit button 511—the processing proceeds to step S405. The CPU 201 in step S405 obtains destination tables saved in the common destination table DB 306, and the obtained destination tables are displayed on the display unit of the operation unit 206. Additionally, based on the information of a user currently logged in, from the personal destination DB 308 and the group destination table DB 307 of a group which the user belongs to, destination tables that the user can reference are obtained, and the obtained destination tables are displayed on the display unit of the operation unit 206.

Figure 6B:

FIG. 6B is a figure illustrating a display screen example of the destination table displayed in step S405.

In FIG. 6B, destination tables saved in the common destination table DB 306, the group destination table DB 307, and the personal destination DB 308 are displayed in a destination table list 602.

By the first embodiment as described above, as with the transfer processing, transfer destinations from destination tables that only a specific user can reference are made to be not be selectable as the destination for a function for transmitting in a state in which the user is not authenticated. Because of this, a problem of a transfer error occurring and a desired destination not being transferred to can be solved.

Also, configuration is such that when a user is not authenticated, a destination can be selected to be a transfer destination or a transmission destination from destination tables of the common destination table DB that all users can reference. Additionally, when a user is authenticated and sets a transmission destination, all destination tables included in a personal destination table and a group destination table of groups to which the user belongs are displayed because the user necessarily sets the transmission destination in an authenticated state. By this, the user can select a destination to be the transmission destination from among the destination table displayed.

Next, according to a second embodiment of the present invention, a method of displaying destination tables when the box function is selected on the menu of FIG. 5A (function selection) screen is described with reference to the flowchart of FIG. 7. Note, description of the configuration of the system according to a second embodiment, the configuration of the image processing apparatus 103, and the like is omitted since they are the same as described previously in the first embodiment.

Figure 7:
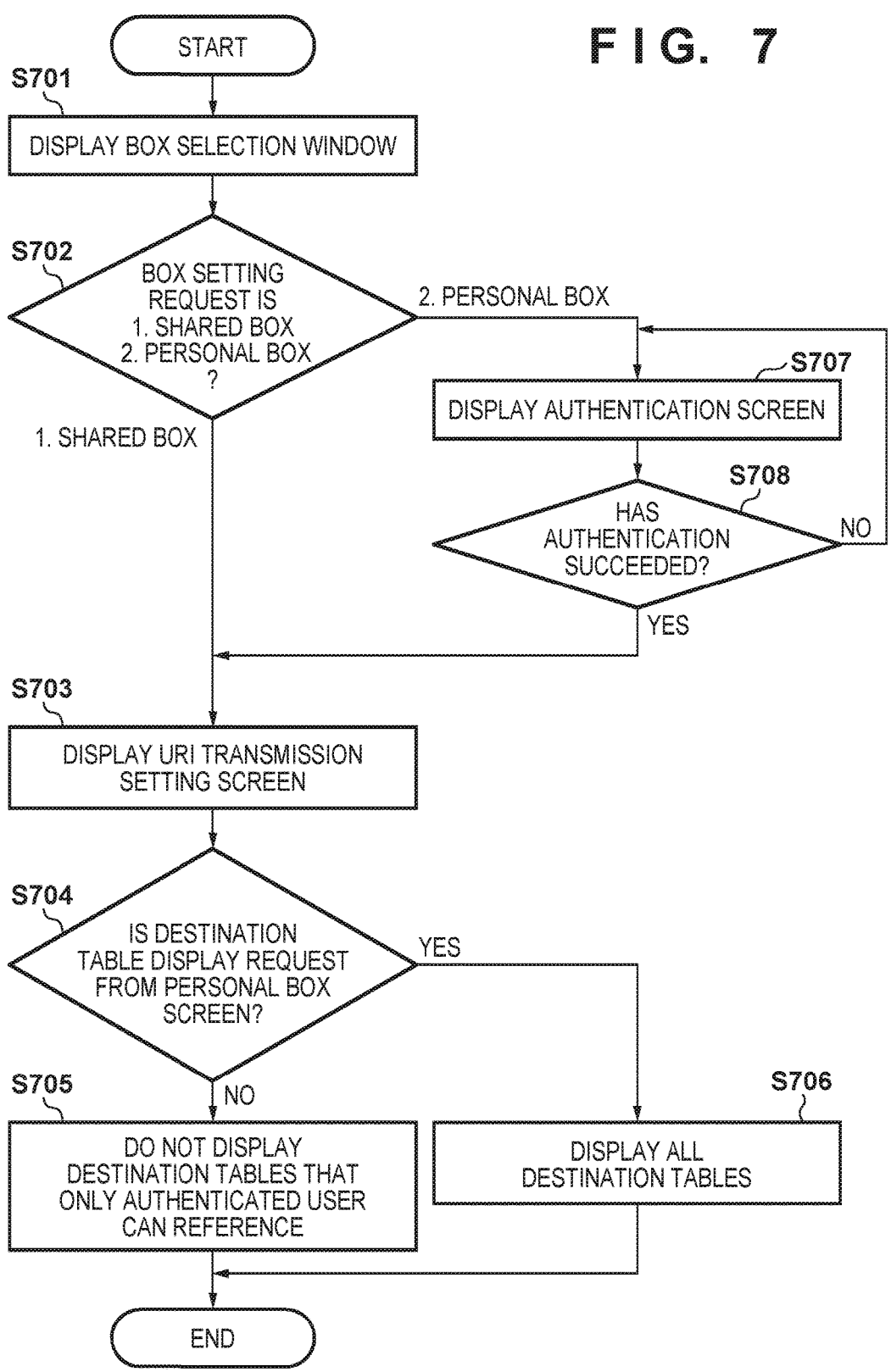
FIG. 7 depicts a flowchart for describing processing for displaying destination tables when a box function is selected in the image processing apparatus according to a second embodiment.

FIG. 7 depicts a flowchart for describing processing for displaying destination tables when the box function is selected in the image processing apparatus 103 according to a second embodiment. Note, the processing illustrated by the flowchart is realized by the CPU 201 loading a program to the RAM 208 from the HDD 203, and executing the program.

Prior to this process being started, the CPU 201 displays the function selection screen of FIG. 5A for example. Then, in step S701 the user presses the box button 512 to select the box function on the screen, and the CPU 201 displays a box selection screen, as illustrated in FIG. 8A for example, on the display unit of the operation unit 206.

The box selection screen of FIG. 8A is a setting screen of the box function which saves the image data scanned and acquired by the scanner unit 205 to the HDD 203. A shared box 801 sets so as to store to a box that all users can reference. A personal box 802 sets so as to store to a box that only the authenticated user can reference. A URI transmission setting 803 is a button which instructs to set a URI of a selected box. The URI transmission setting 803 is pressed in a state in which shared box 801 is selected, and a URI transmission setting screen is displayed as illustrated in FIG. 8C. When the URI transmission setting 803 is pressed in a state in which personal box 802 is selected, a URI transmission setting screen is displayed as illustrated in FIG. 8C if the user is authenticated. At that time, if the user is not authenticated, a screen for authenticating the user is displayed as illustrated in FIG. 8B.

Regarding FIG. 8C, the user can designate from among the destination tables displayed in step S705 or in step S706 of FIG. 7 a URI of a box that is selected via the URI transmission destination setting screen. Note, URI here is an abbreviation of Uniform Resource Identifier, and is defined by RFC 3986. The URI transmission setting is something for setting a URI that indicates a storage location of the box when image data is stored in the box.

On the box selection screen of FIG. 8A for example, when the user selects shared box 801 and presses the URI transmission setting 803, it becomes possible to select a URI of a shared box by referencing a destination table other than the destination tables that only an authenticated user can reference. On the other hand, in the box selection screen of FIG. 8A, when the user selects personal box 802 and presses the URI transmission setting 803, it becomes possible to select a personal box URI referencing all destination tables. This will be described in detail below.

When it is detected that the user pressed the URI transmission setting 803 on the box selection screen of FIG. 8A the processing proceeds to step S702, and the CPU 201 determines which of shared box 801 or personal box 802 is selected. Here, if it is determined that shared box 801 is selected the processing proceeds to step S703, and if it is determined that personal box 802 is selected the processing proceeds to step S707. The CPU 201 in step S707 displays the authentication screen illustrated in FIG. 8B for example. Here, when the user inputs a user name and a password and presses the OK button the processing proceeds to step S708, and the CPU 201 performs authentication of the user and determines whether or not user authentication has succeeded. The authentication processing in such a case compares the username and password input via the authentication screen with the user information stored in the image processing apparatus 103, and when a username and password set is registered as user information, determines if the user authentication has succeeded. Thus, in step S708 when it is determined that the user authentication has succeeded the processing proceeds to step S703, and when not the processing returns to step S707. The CPU 201 in step S703 displays the URI transmission setting screen on the display unit of the operation unit 206 as illustrated in FIG. 8C for example. With this, a request to display destination tables to reference in order to set the URI transmission destination is issued.

Next, the processing proceeds to step S704 and the CPU 201 determines whether the destination table display corresponds to shared box or personal box. In other words, in step S702, it is determined which of shared box 801 and personal box 802 is selected. Here, if it is determined to be a request from the personal box function, the processing proceeds to step S706, the destination tables saved in the common destination table DB 306 are obtained, and additionally, destination tables from the group destination table DB 307 and the personal destination DB 308 are obtained, and these are displayed. With this, the destination display screen as illustrated in FIG. 6B described previously is displayed for example.

Meanwhile, when the CPU 201 in step S704 determines that it is a request from the shared box function, the processing proceeds to step S705, and it obtains and displays destination tables saved in the common destination table DB 306. With this, the destination display screen as illustrated in FIG. 6A described previously is displayed for example.

As described above, by the second embodiment, because it is possible to set a URI transmission destination of a box that all users share, where the destinations from destination tables that only a specific user can reference have been caused not to be selectable in relation to such a box, the convenience of the user is improved. On the other hand, when it is a URI transmission destination of a personal box that can be referenced by an authenticated user, the transmission destination can be selected from all destination tables. Because of this, it is possible to prevent a situation in which data of the shared box is not transmitted to the URI from occurring.

By virtue of the present invention, a possibility of a transfer error or desired destination not being transferred to can be reduced by causing destinations of destination tables that only a specific user linked to user authentication can reference be not be settable to a transfer destination.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-136369 filed on Jul. 7, 2015, which is hereby incorporated by reference herein in its entirety.

What is claimed is:

1. An image processing apparatus comprising:
a scanner configured to scan an image for generating image data;
a storage configured to store a first address book associated with user information and a second address book not associated with the user information; and
one or more processors configured to execute a set of instructions to;
in a case where a transmitting destination is set for a transferring function for transmitting image data received from an external apparatus, enable to set a transmitting destination from the second address book without enabling to set a transmitting destination from the first address book;
set a transmitting destination and a condition for the transferring function, and
execute, in accordance with satisfaction of the set condition, the transferring function by using the set transmitting destination.

2. The apparatus according to claim 1, wherein the one or more processors execute the instructions to:
in a case where a transmitting destination is set for the transferring function, enable to display the second address book without enabling to display the first address book.

3. The apparatus according to claim 2, wherein the one or more processors execute the instructions to:
receive a display request of an address book, and
in a case where a transmitting destination is set for the transferring function and the display request is received, enable to display the second address book without enabling to display the first address book.

4. The apparatus according to claim 1, wherein
the first address book is an address book which is able to be referred only while a user of user information associated with the first address book is logged in to the image processing apparatus and which is not able to be referred while a user different from the user is logged in to the image processing apparatus, and
the second address book is an address book which can be referred while any user is logged in to the image processing apparatus.

5. The apparatus according to claim 1, wherein the one or more processors execute the instructions to:
in a case where a transmitting destination is set for a transmitting function for transmitting image data generated by the scanner, enable to set a transmitting destination from the first address book and the second address book;
set a transmitting destination for the transmitting function, and
execute a transmitting function by using the set transmitting destination.

6. A method of controlling an image processing apparatus which has a scanner configured to scan an image for generating image data and which has a transferring function for transmitting image data received from an external apparatus, and which has a storage configured to store a first address book associated with user information and a second address book not associated with the user information, the method comprising:
in a case where a transmitting destination is set for the transferring function, enabling to set a transmitting destination from the second address book without enabling to set a transmitting destination from the first address book;
setting a transmitting destination and a condition for the transferring function; and
executing, in accordance with satisfaction of the set condition, the transferring function by using the set transmitting destination.

7. The method according to claim 6, further comprising:
in a case where a transmitting destination is set for the transferring function, enabling to display the second address book without enabling to display the first address book.

8. The method according to claim 7, further comprising:
receiving a display request of an address book; and
in a case where a transmitting destination is set for the transferring function and the display request is received, enabling to display the second address book without enabling to display the first address book.

9. The method according to claim 6, wherein
the first address book is an address book which can be referred only while a user of user information associated with the first address book is logged in to the image processing apparatus and which cannot be referred while a user different from the user is logged in to the image processing apparatus, and the second address book is an address book which can be referred while any user is logged in to the image processing apparatus.

10. A non-transitory computer-readable storage medium storing a computer program for causing a computer to execute each step of a method of controlling an image processing apparatus which has a scanner configured to scan an image for generating an image data and which has a transferring function for transmitting an image data received from an external apparatus, and which has a storage configured to store a first address book associated with user information and a second address book not associated with the user information, the method comprising:

in a case where a transmitting destination is set for the transferring function, enabling to set a transmitting destination from the second address book without enabling to set a transmitting destination from the first address book;

setting a transmitting destination and a condition for the transferring function; and executing, in accordance with satisfaction of the set condition, the transferring function by using the set transmitting destination.

* * * * *